(12) United States Patent
Huang et al.

(10) Patent No.: US 12,424,934 B2
(45) Date of Patent: Sep. 23, 2025

(54) SYSTEMS AND METHODS FOR PERFORMING SELF-DETECTION AND PRE-START PROCESSES FOR CHARGE PUMPS

(71) Applicant: ON-BRIGHT ELECTRONICS (SHANGHAI) CO., LTD., Shanghai (CN)

(72) Inventors: Jianfeng Huang, Shanghai (CN); Chao Yao, Shanghai (CN); Qiang Luo, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/202,227

(22) Filed: May 25, 2023

(65) Prior Publication Data

US 2023/0318449 A1 Oct. 5, 2023

(30) Foreign Application Priority Data

Mar. 29, 2022 (CN) .......................... 202210318614.9

(51) Int. Cl.
*H02M 3/07* (2006.01)
*H02M 1/08* (2006.01)

(52) U.S. Cl.
CPC ............... *H02M 3/07* (2013.01); *H02M 1/08* (2013.01)

(58) Field of Classification Search
CPC ............ H02M 3/07; H02M 1/08; H02M 1/32; H02M 1/36; H02M 3/073; H02M 3/06; H02M 3/071; H02M 3/072; H02M 1/325; Y02B 70/10
See application file for complete search history.

(56) References Cited

U.S. PATENT DOCUMENTS

| 2008/0238383 | A1* | 10/2008 | Watanabe | ............. H02M 3/158 323/271 |
| 2021/0203223 | A1 | 7/2021 | Chang | |
| 2021/0313892 | A1* | 10/2021 | Kim | ........................ H02M 3/06 |

FOREIGN PATENT DOCUMENTS

| CN | 102684163 A | 9/2012 |
| CN | 109565240 A | 4/2019 |

OTHER PUBLICATIONS

Taiwan Intellectual Property Office, Office Action issued May 26, 2023, in Application No. 111127822.

* cited by examiner

*Primary Examiner* — Jung Kim
(74) *Attorney, Agent, or Firm* — Faegre Drinker Biddle & Reath LLP

(57) ABSTRACT

Charge pump and method therefor. For example, a charge pump for converting an input voltage to an output voltage includes: a first capacitor connected between a first terminal and a second terminal; a second capacitor connected between the second terminal and a third terminal; a first transistor including a first drain, a first source, and a first gate, the first drain being connected to an input terminal configured to receive the input voltage; a second transistor including a second drain, a second source, and a second gate; a third transistor; a fourth transistor; and an internal circuit configured to perform a self-detection process by determining whether or not at least one defect has been detected for at least one component selected from a group consisting of the first capacitor, the second capacitor, the first transistor, the second transistor, the third transistor, and the fourth transistor.

29 Claims, 6 Drawing Sheets

SYSTEMS AND METHODS FOR PERFORMING SELF-DETECTION AND PRE-START PROCESSES FOR CHARGE PUMPS

1. CROSS-REFERENCES TO RELATED APPLICATIONS

This application claims priority to Chinese Patent Application No. 202210318614.9, filed Mar. 29, 2022, incorporated by reference herein for all purposes.

2. BACKGROUND OF THE INVENTION

Certain embodiments of the present invention are directed to circuits. More particularly, some embodiments of the invention provide systems and methods for preforming self-detection and pre-start processes. Merely by way of example, some embodiments of the invention have been applied to charge pumps. But it would be recognized that the invention has a much broader range of applicability.

A charge pump often is a DC-to-DC power converter that uses a capacitor to store energy and uses a switch to charge and/or discharge the capacitor in order to convert the input voltage of the charge pump to an output voltage. As an example, for an electronic device, the voltage of a power supply falls outside the voltage range for normal operation of the electronic device. Using the voltage of the power supply as the input voltage, the charge pump usually can generate the output voltage that falls within the voltage range for normal operation of the electronic device.

FIG. 1 is a simplified diagram showing a conventional charge pump. The charge pump 100 includes a circuit 102, a circuit 104, a capacitor 106, an input terminal 190, and an output terminal 192. For example, the circuit 102 and the circuit 104 are symmetrical with each other. As an example, the capacitor 106 is located between the circuit 102 and the circuit 104. The circuit 102 includes transistors 112, 114, 116 and 118, and capacitors 132 and 134, and the circuit 104 includes transistors 122, 124, 126 and 128, and capacitors 142 and 144. The input terminal 190 (e.g., a pin) is connected to a power supply in order to receive an input voltage from the power supply, and the output terminal 192 (e.g., a pin) is connected to an electronic device in order to provide an output voltage to the electronic device. The charge pump 100 converts the input voltage to the output voltage.

The charge pump 100 switches between an operation phase A and an operation phase B. For example, during the operation phase A, the transistors 112, 116, 124 and 128 are turned on, and the transistors 114, 118, 122 and 126 are turned off. As an example, during the operation phase B, the transistors 114, 118, 122 and 126 are turned on, and the transistors 112, 116, 124 and 128 are turned off.

When the charge pump 100 changes from the operation phase A to the operation phase B, the charge pump 100 converts the input voltage at the input terminal 190 to the output voltage at the output voltage at the output terminal 192 through the capacitor 134. When the charge pump 100 changes from the operation phase B to the operation phase A, the charge pump 100 converts the input voltage at the input terminal 190 to the output voltage at the output terminal 192 through the capacitor 144. For example, the output voltage at the output terminal 192 is equal to half of the input voltage at the input terminal 190.

Hence it is highly desirable to improve the technique for charge pumps.

3. BRIEF SUMMARY OF THE INVENTION

Certain embodiments of the present invention are directed to circuits. More particularly, some embodiments of the invention provide systems and methods for preforming self-detection and pre-start processes. Merely by way of example, some embodiments of the invention have been applied to charge pumps. But it would be recognized that the invention has a much broader range of applicability.

According to certain embodiments, a charge pump for converting an input voltage to an output voltage includes: a first capacitor connected between a first terminal and a second terminal; a second capacitor connected between the second terminal and a third terminal; a first transistor including a first drain, a first source, and a first gate, the first drain being connected to an input terminal configured to receive the input voltage; a second transistor including a second drain, a second source, and a second gate, the second drain being connected to the first source and the second terminal; a third transistor including a third drain, a third source, and a third gate, the third drain being connected to the second source and an output terminal configured to output the output voltage; a fourth transistor including a fourth drain, a fourth source, and a fourth gate, the fourth drain being connected to the third source and the third terminal, the fourth source being connected to a ground terminal; and an internal circuit configured to perform a self-detection process by determining whether or not at least one defect has been detected for at least one component selected from a group consisting of the first capacitor, the second capacitor, the first transistor, the second transistor, the third transistor, and the fourth transistor; wherein the at least one defect includes an open circuit related to the component or a short circuit related to the component.

According to certain embodiments, a method for a charge pump configured to convert an input voltage to an output voltage includes: performing a self-detection process including determining whether or not at least one defect has been detected for at least one component selected from a group consisting of a first capacitor, a second capacitor, a first transistor, a second transistor, a third transistor, and a fourth transistor; wherein: the first capacitor is connected between a first terminal and a second terminal; the second capacitor is connected between the second terminal and a third terminal; the first transistor including a first drain, a first source, and a first gate, the first drain being connected to an input terminal configured to receive the input voltage; the second transistor including a second drain, a second source, and a second gate, the second drain being connected to the first source and the second terminal; the third transistor including a third drain, a third source, and a third gate, the third drain being connected to the second source and an output terminal configured to output the output voltage; and the fourth transistor including a fourth drain, a fourth source, and a fourth gate, the fourth drain being connected to the third source and the third terminal, the fourth source being connected to a ground terminal; wherein the at least one defect includes an open circuit related to the component or a short circuit related to the component.

Depending upon embodiment, one or more benefits may be achieved. These benefits and various additional objects, features and advantages of the present invention can be fully

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for preforming self-detection and pre-start processes. Merely by way of example, some embodiments of the invention have been applied to charge pumps. But it would be recognized that the invention has a much broader range of applicability.

Figure 1:
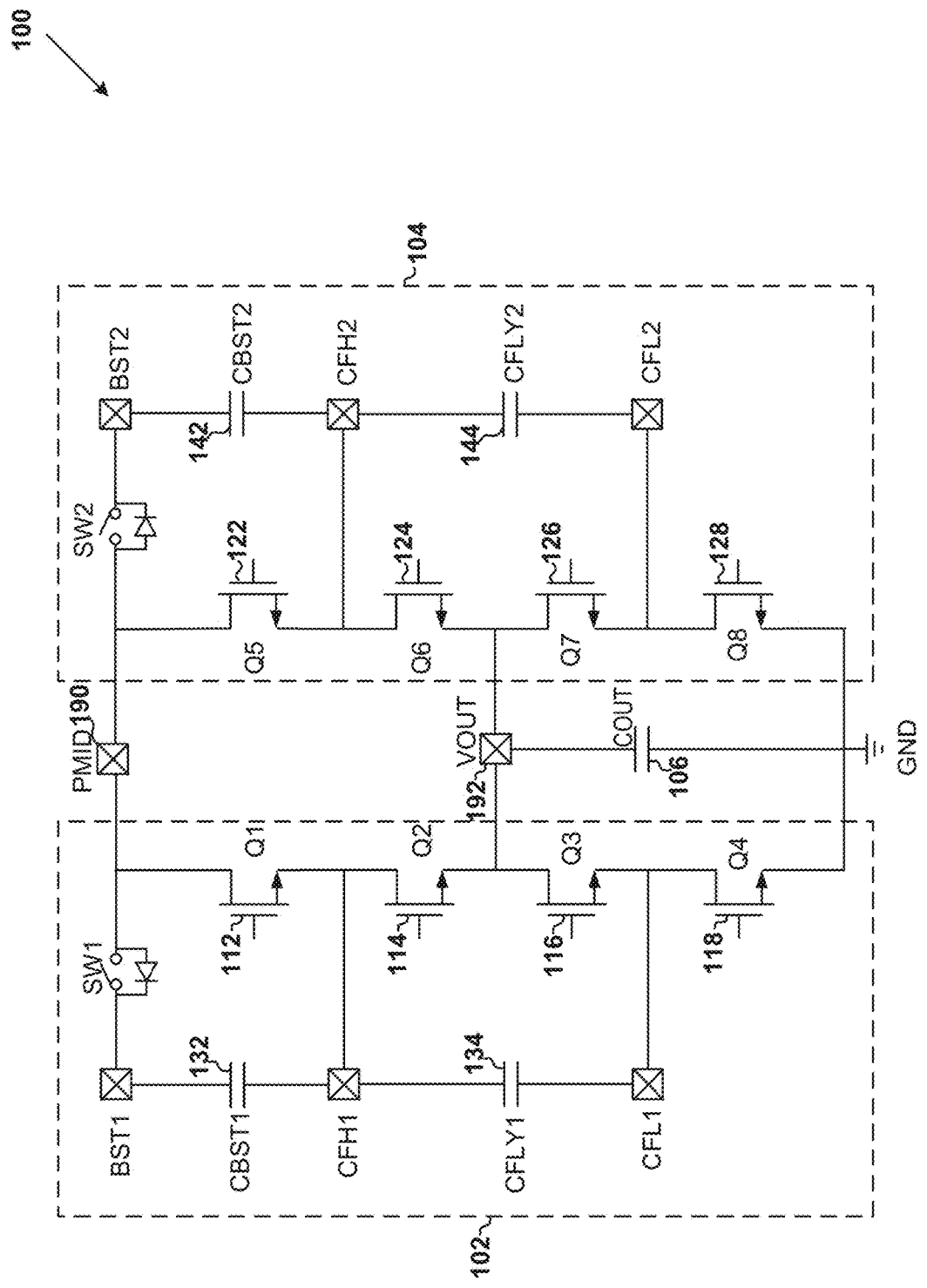
FIG. 1 is a simplified diagram showing a conventional charge pump.

As shown in FIG. 1, before the charge pump 100 starts normal operation, it is important that each capacitor of the capacitors 132, 134, 142 and 144 does not form a short circuit between two terminals of the capacitor, and it is also important that each transistor of the transistors 112, 114, 116, 118, 122, 124, 126, and 128 does not form a short circuit between the drain terminal and the source terminal of the transistor when the transistor is turned off, and also does not form an open circuit between the drain terminal and the source terminal of the transistor when the transistor is turned on according to certain embodiments. Also, before the charge pump 100 starts normal operation, each capacitor of the capacitors 134 and 144 needs to be charged and/or discharged to a predetermined threshold.

Figure 2:
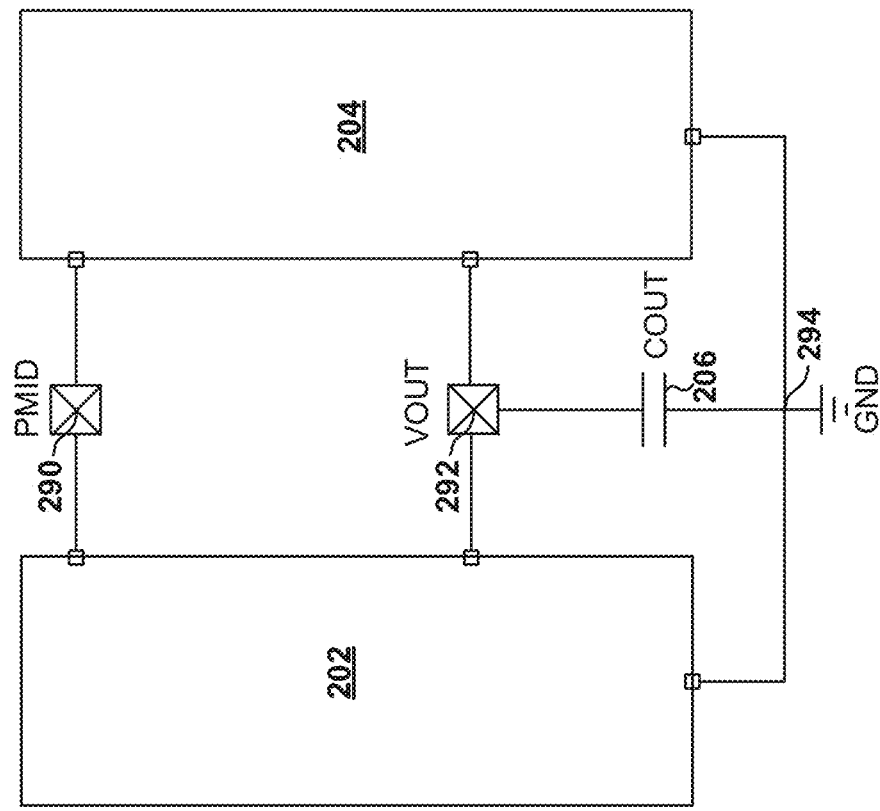
FIG. 2 is a simplified diagram showing a charge pump according to certain embodiments of the present invention.
Figure 3:
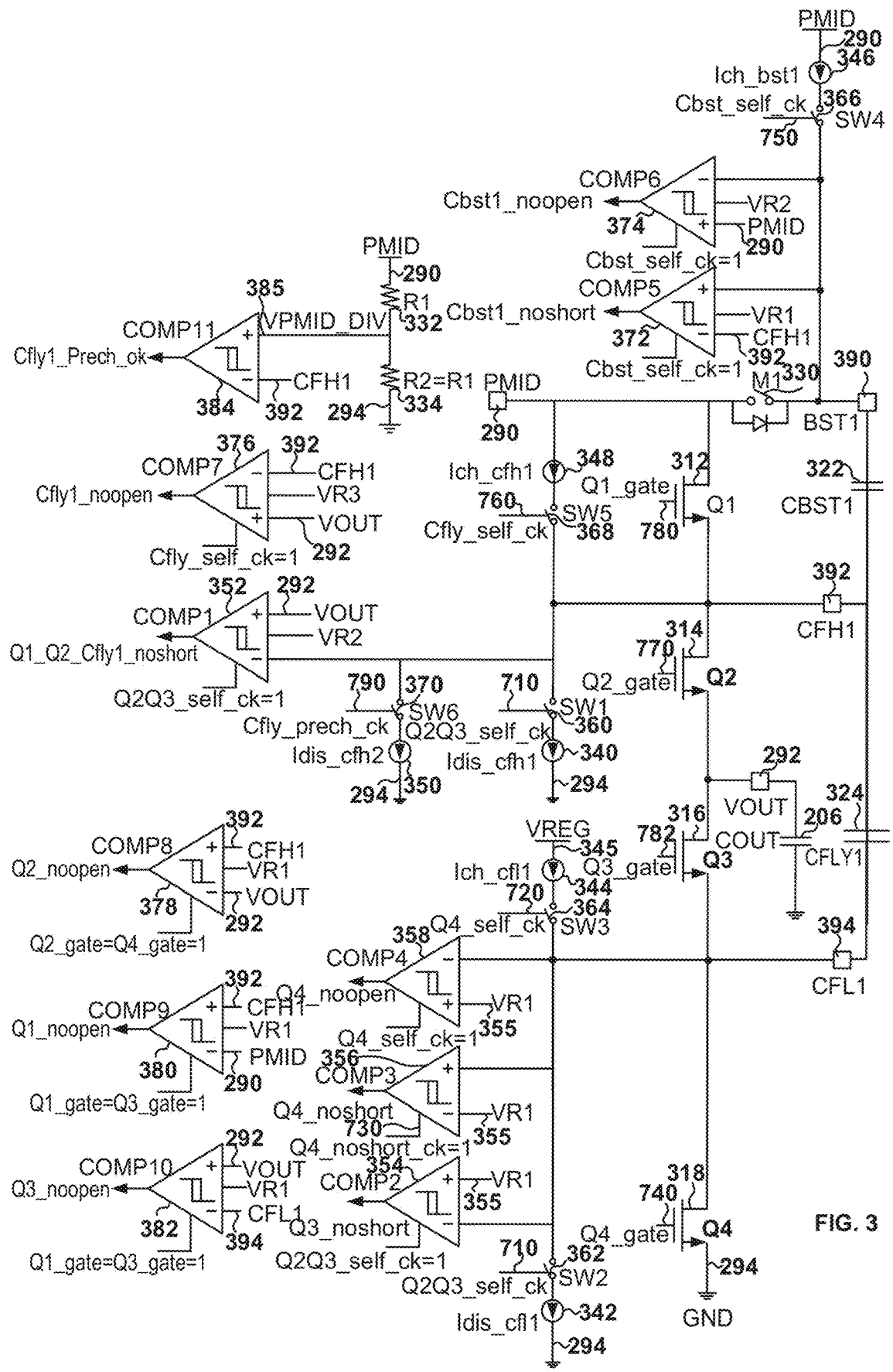
FIG. 3 is a simplified diagram showing certain components of a circuit of the charge pump as shown in FIG. 2 according to some embodiments of the present invention.
Figure 4:
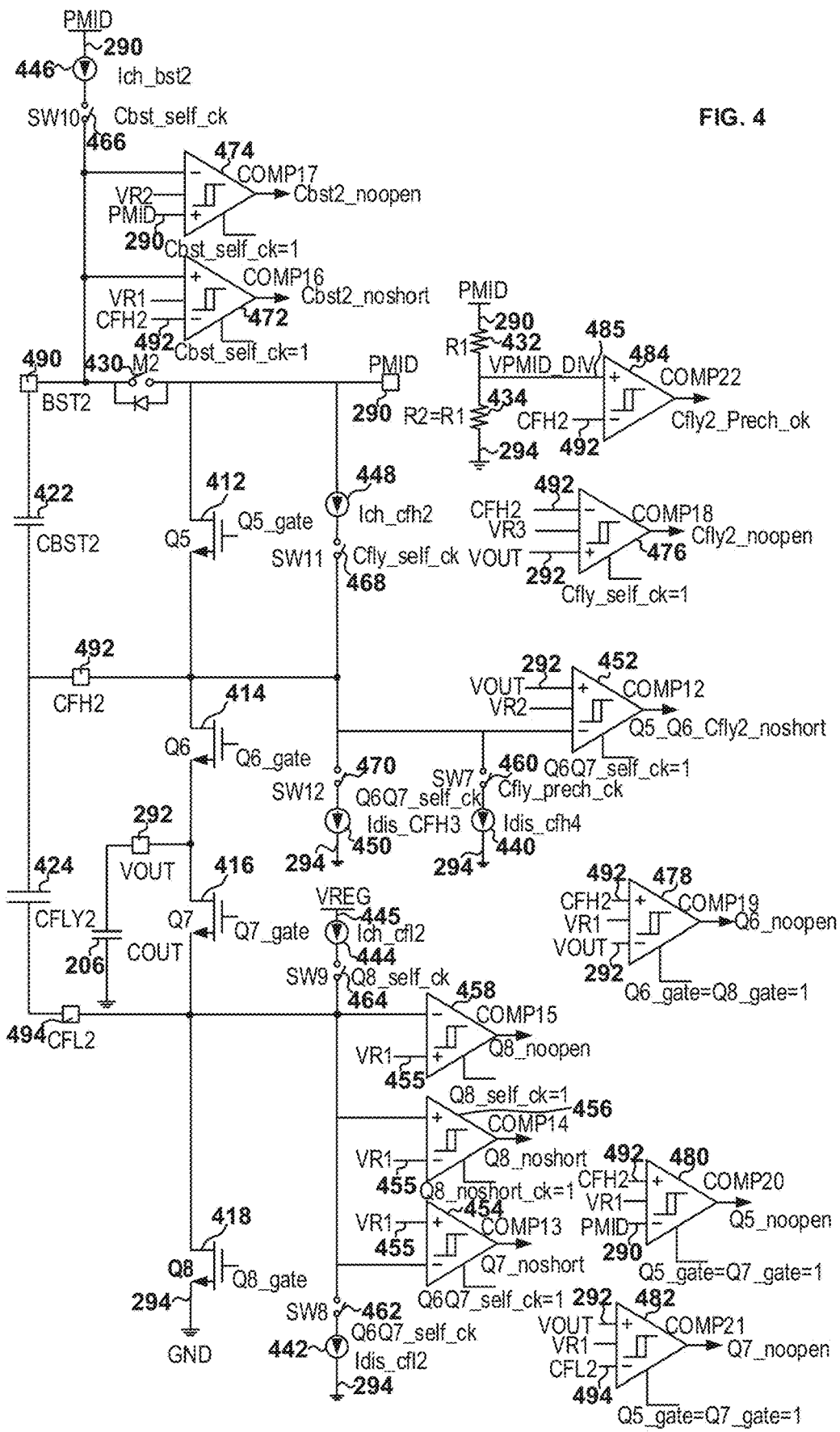
FIG. 4 is a simplified diagram showing certain components of a circuit of the charge pump as shown in FIG. 2 according to some embodiments of the present invention.

FIG. 2 is a simplified diagram showing a charge pump according to certain embodiments of the present invention. This diagram is merely an example, which should not unduly limit the scope of the claims. One of ordinary skill in the art would recognize many variations, alternatives, and modifications. The charge pump 200 includes a circuit 202, a circuit 204, a capacitor 206, an input terminal 290, an output terminal 292, and a ground terminal 294. The circuit 202 as shown in FIG. 2 includes all components of the circuit 202 as shown in FIG. 3, and the circuit 204 as shown in FIG. 2 includes all components of the circuit 204 as shown in FIG. 4. In some examples, the circuit 202 and the circuit 204 are symmetrical with each other. In certain examples, the capacitor 206 is located between the circuit 202 and the circuit 204. For example, the input terminal 290 (e.g., a pin) receives an input voltage (e.g., from a power supply), the output terminal 292 (e.g., a pin) provides an output voltage (e.g., to an electronic device), and the ground terminal 294 (e.g., a pin) is biased to a ground voltage. As an example, the charge pump 200 converts the input voltage at the input terminal 290 to the output voltage at the output terminal 292.

FIG. 3 is a simplified diagram showing certain components of the circuit 202 of the charge pump 200 as shown in FIG. 2 according to some embodiments of the present invention. This diagram is merely an example, which should not unduly limit the scope of the claims. One of ordinary skill in the art would recognize many variations, alternatives, and modifications. The circuit 202 includes transistors 312, 314, 316 and 318, capacitors 322 and 324, a transistor 330, terminals 390, 392 and 394, resistors 332 and 334, current sources 340, 342, 344, 346, 348 and 350, switches 360, 362, 364, 366, 368 and 370, and comparators 352, 354, 356, 358, 372, 374, 376, 378, 380, 382 and 384. As an example, the transistor 330, the resistors 332 and 334, the current sources 340, 342, 344, 346, 348 and 350, the switches 360, 362, 364, 366, 368 and 370, and the comparators 352, 354, 356, 358, 372, 374, 376, 378, 380, 382 and 384 are parts of an internal circuit, which, for example, is configured to perform a self-detection process and a pre-start process. Although the above has been shown using a selected group of components for the circuit 202 of the charge pump 200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the source of the transistor 312 is connected to the drain of the transistor 314, the source of the transistor of the transistor 314 is connected to the drain of the transistor 316, and the source of the transistor 316 is connected to the drain of the transistor 318. For example, the drain of the transistor 312 is connected to the input terminal 290, the source of the transistor 318 is connected to the ground terminal 294, and the drain of the transistor 316 is connected to the output terminal 292. As an example, the capacitor 322 is connected between the terminal 390 and the terminal 392, and the capacitor 324 is connected between the terminal 392 and the terminal 394. In some examples, the transistor 330 is connected between the terminal 390 and the input terminal 290.

In some embodiments, the non-inverting input terminal of the comparator 352 and the non-inverting input terminal of the comparator 376 are connected to the output terminal 292, and the inverting input terminal of the comparator 352 and the inverting input terminal of the comparator 376 are connected to the terminal 392. For example, the current source 340 and the switch 360 are in series, and the combination of the current source 340 and the switch 360 is connected between the terminal 392 and the ground terminal 294. As an example, the current source 350 and the switch 370 are in series, and the combination of the current source 350 and the switch 370 is connected between the terminal 392 and the ground terminal 294. In certain examples, the current source 348 and the switch 368 are in series, and the combination of the current source 348 and the switch 368 is connected between the input terminal 290 and the terminal 392.

According to certain embodiments, the non-inverting input terminal of the comparator 354 and the non-inverting input terminal of the comparator 358 receive a reference voltage 355, and the inverting input terminal of the comparator 354 and the inverting input terminal of the comparator 358 are connected to the terminal 394. For example, the inverting input terminal of the comparator 356 receives the reference voltage 355, and the non-inverting input terminal of the comparator 356 is connected to the terminal 394. In some examples, the current source 342 and the switch 362 are in series, and the combination of the current source 342 and the switch 362 is connected between the terminal 394 and the ground terminal 294. In certain examples, the current source 344 and the switch 364 are in series, and the combination of the current source 344 and the switch 364 is connected to the terminal 394 at one end and also receives an internal voltage 345 at another end.

According to some embodiments, the non-inverting input terminal of the comparator 372 is connected to the terminal 390, and the inverting input terminal of the comparator 372 is connected to the terminal 392. For example, the non-inverting input terminal of the comparator 374 is connected to the input terminal 290, and the inverting input terminal of the comparator 374 is connected to the terminal 390. As an example, the current source 346 and the switch 366 are in series, and the combination of the current source 346 and the switch 366 is connected between the input terminal 290 and the terminal 390.

In certain embodiments, the non-inverting input terminal of the comparator 378 is connected to the terminal 392, and the inverting input terminal of the comparator 378 is connected to the output terminal 292. In some examples, the non-inverting input terminal of the comparator 380 is connected to the terminal 392, and the inverting input terminal of the comparator 380 is connected to the input terminal 290. In certain examples, the non-inverting input terminal of the comparator 382 is connected to the output terminal 292, and the inverting input terminal of the comparator 382 is connected to the terminal 394.

In some embodiments, the inverting input terminal of the comparator 384 is connected to the terminal 392, and the non-inverting input terminal of the comparator 384 receives a voltage 385, which is generated by the resistors 332 and 334. For example, the resistors 332 and 334 are in series, and the combination of the resistors 332 and 334 is connected between the input terminal 290 and the ground terminal 294. As an example, the resistors 332 and 334 have the same resistance value, and the voltage 385 is equal to half of the input voltage at the input terminal 290.

According to certain embodiments, the charge pump 200 converts the input voltage (e.g., PMID as shown in FIG. 3) at the input terminal 290 to the output voltage (e.g., VOUT as shown in FIG. 3) at the output terminal 292. For example, the output voltage at the output terminal 292 is equal to half of the input voltage at the input terminal 290. According to some embodiments, the resistors 332 and 334, the current sources 340, 342, 344, 346, 348 and 350, the switches 360, 362, 364, 366, 368 and 370, and the comparators 352, 354, 356, 358, 372, 374, 376, 378, 380, 382 and 384 are used to perform the self-detection process and the pre-start process.

In certain examples, the self-detection process is performed to ensure that each capacitor of the capacitors 322 and 324 is not defective and also to ensure that each transistor of the transistors 312, 314, 316 and 318 is not defective. For example, the self-detection process is performed to ensure that each capacitor of the capacitors 322 and 324 is not defectively related to a short circuit (e.g., to ensure that each capacitor of the capacitors 322 and 324 does not form a short circuit between two terminals of the capacitor) and also to ensure that each capacitor of the capacitors 322 and 324 is not defectively related to an open circuit (e.g., to ensure that each capacitor of the capacitors 322 and 324 does not form an open circuit caused by one or more capacitor plates being disconnected from one or more corresponding wires), and the self-detection process is also performed to ensure that each transistor of the transistors 312, 314, 316 and 318 is not defectively related to a short circuit (e.g., to ensure that each transistor of the transistors 312, 314, 316 and 318 does not form a short circuit between the drain terminal and the source terminal of the transistor when the transistor is turned off) and also to ensure that each transistor of the transistors 312, 314, 316 and 318 is not defectively related to an open circuit (e.g., to ensure that each transistor of the transistors 312, 314, 316 and 318 does not form an open circuit between the drain terminal and the source terminal of the transistor when the transistor is turned on).

In some examples, the pre-start process is performed to charge and/or discharge the capacitor 324 so that the voltage drop across the capacitor 324 satisfies a predetermined condition before the charge pump 200 starts normal operation. For example, the pre-start process is performed to discharge the capacitor 324 so that the voltage drop across the capacitor 324 becomes smaller than half of the input voltage at the input terminal 290 (e.g., half of PMID as shown in FIG. 3) before the charge pump 200 starts normal operation.

According to some embodiments, the switch 360 receives a control signal 710 (e.g., Q2Q3_self_ck), which is used to turn on and/or turn off the switch 360, and the switch 362 also receives the control signal 710 (e.g., Q2Q3_self_ck), which is used to turn on and/or turn off the switch 362. For example, the switch 364 receives a control signal 720 (e.g., Q4_self_ck), which is used to turn on and/or turn off the switch 364. As an example, the comparator 356 receives a control signal 730 (e.g., Q4_noshort_ck), which is used to enable the comparator 356 when the control signal 730 is at a logic high level. For example, the transistor 318 receives a control signal 740 (e.g., Q4_gate), which is used to turn on and/or turn off the transistor 318. As an example, the switch 366 receives a control signal 750 (e.g., Cbst_self_ck), which is used to turn on and/or turn off the switch 366. For example, the switch 368 receives a control signal 760 (e.g., Cfly_self_ck), which is used to turn on and/or turn off the switch 368. As an example, the transistor 314 receives a control signal 770 (e.g., Q2_gate), which is used to turn on and/or turn off the transistor 312. For example, the transistor 312 receives a control signal 780 (e.g., Q1_gate), which is used to turn on and/or turn off the transistor 312, and the transistor 316 receives a control signal 782 (e.g., Q3_gate), which is used to turn on and/or turn off the transistor 316. As an example, the switch 350 receives a control signal 790 (e.g., Cfly_prech_ck), which is used to turn on and/or turn off the switch 350.

FIG. 4 is a simplified diagram showing certain components of the circuit 204 of the charge pump 200 as shown in FIG. 2 according to some embodiments of the present invention. This diagram is merely an example, which should not unduly limit the scope of the claims. One of ordinary skill in the art would recognize many variations, alternatives, and modifications. The circuit 204 includes transistors 412, 414, 416 and 418, capacitors 422 and 424, a transistor 430, terminals 490, 492 and 494, resistors 432 and 434, current sources 440, 442, 444, 446, 448 and 450, switches 460, 462, 464, 466, 468 and 470, and comparators 452, 454, 456, 458, 472, 474, 476, 478, 480, 482 and 484. As an example, the transistor 430, the resistors 432 and 434, the current sources 440, 442, 444, 446, 448 and 450, the switches 460, 462, 464, 466, 468 and 470, and the comparators 452, 454, 456, 458, 472, 474, 476, 478, 480, 482 and 484 are parts of an internal circuit, which, for example, is configured to perform a self-detection process and a pre-start process. Although the above has been shown using a selected group of components for the circuit 204 of the charge pump 200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the source of the transistor 412 is connected to the drain of the transistor 414, the source of the transistor of the transistor 414 is connected to the drain of the transistor 416, and the source of the transistor 416 is connected to the drain of the transistor 418. For example, the drain of the transistor 412 is connected to the input terminal 290, the source of the transistor 418 is connected to the ground terminal 294, and the drain of the transistor 416 is connected to the output terminal 292. As an example, the capacitor 422 is connected between the terminal 490 and the terminal 492, and the capacitor 424 is connected between the terminal 492 and the terminal 494. In some examples, the transistor 430 is connected between the terminal 490 and the input terminal 290.

In some embodiments, the non-inverting input terminal of the comparator 452 and the non-inverting input terminal of the comparator 476 are connected to the output terminal 292, and the inverting input terminal of the comparator 452 and the inverting input terminal of the comparator 476 are connected to the terminal 492. For example, the current source 440 and the switch 460 are in series, and the combination of the current source 440 and the switch 460 is connected between the terminal 492 and the ground terminal 294. As an example, the current source 450 and the switch 470 are in series, and the combination of the current source 450 and the switch 470 is connected between the terminal 492 and the ground terminal 294. In certain examples, the current source 448 and the switch 468 are in series, and the combination of the current source 448 and the switch 468 is connected between the input terminal 290 and the terminal 492.

According to certain embodiments, the non-inverting input terminal of the comparator 454 and the non-inverting input terminal of the comparator 458 receive a reference voltage 455, and the inverting input terminal of the comparator 454 and the inverting input terminal of the comparator 458 are connected to the terminal 494. For example, the inverting input terminal of the comparator 456 receives the reference voltage 455, and the non-inverting input terminal of the comparator 456 is connected to the terminal 494. In some examples, the current source 442 and the switch 462 are in series, and the combination of the current source 442 and the switch 462 is connected between the terminal 494 and the ground terminal 294. In certain examples, the current source 444 and the switch 464 are in series, and the combination of the current source 444 and the switch 464 is connected to the terminal 494 at one end and also receives an internal voltage 445 at another end.

According to some embodiments, the non-inverting input terminal of the comparator 472 is connected to the terminal 490, and the inverting input terminal of the comparator 472 is connected to the terminal 492. For example, the non-inverting input terminal of the comparator 474 is connected to the input terminal 290, and the inverting input terminal of the comparator 474 is connected to the terminal 490. As an example, the current source 446 and the switch 466 are in series, and the combination of the current source 446 and the switch 466 is connected between the input terminal 290 and the terminal 490.

In certain embodiments, the non-inverting input terminal of the comparator 478 is connected to the terminal 492, and the inverting input terminal of the comparator 478 is connected to the output terminal 292. In some examples, the non-inverting input terminal of the comparator 480 is connected to the terminal 492, and the inverting input terminal of the comparator 480 is connected to the input terminal 290. In certain examples, the non-inverting input terminal of the comparator 482 is connected to the output terminal 292, and the inverting input terminal of the comparator 482 is connected to the terminal 494.

In some embodiments, the inverting input terminal of the comparator 484 is connected to the terminal 492, and the non-inverting input terminal of the comparator 484 receives a voltage 485, which is generated by the resistors 432 and 434. For example, the resistors 432 and 434 are in series, and the combination of the resistors 432 and 434 is connected between the input terminal 290 and the ground terminal 294. As an example, the resistors 432 and 434 have the same resistance value, and the voltage 485 is equal to half of the input voltage at the input terminal 290.

According to certain embodiments, the charge pump 200 converts the input voltage at the input terminal 290 to the output voltage at the output terminal 292. For example, the output voltage at the output terminal 292 is equal to half of the input voltage at the input terminal 290. According to some embodiments, the resistors 432 and 434, the current sources 440, 442, 444, 446, 448 and 450, the switches 460, 462, 464, 466, 468 and 470, and the comparators 452, 454, 456, 458, 472, 474, 476, 478, 480, 482 and 484 are used to perform the self-detection process and the pre-start process. For example, the self-detection process is performed to ensure that each capacitor of the capacitors 422 and 424 does not form a short circuit (e.g., a short circuit between two terminals of the capacitor) and also does not form an open circuit (e.g., an open circuit caused by one or more capacitor plates being disconnected from one or more corresponding wires), and each transistor of the transistors 412, 414, 416 and 418 does not form a short circuit between the drain terminal and the source terminal of the transistor when the transistor is turned off and also does not form an open circuit between the drain terminal and the source terminal of the transistor when the transistor is turned on. As an example, the pre-start process is performed to charge and/or discharge the capacitor 424 to a predetermined threshold before the charge pump 200 starts normal operation.

Referring to FIG. 3 and FIG. 4, the resistor 332 and the resistor 432 are the same resistor, and the resistor 334 and the resistor 434 are the same resistor according to certain embodiments. For example, the voltage 385 and the voltage 485 are the same voltage. As an example, the reference voltage 355 and the reference voltage 455 are the same reference voltage.

Figure 5:
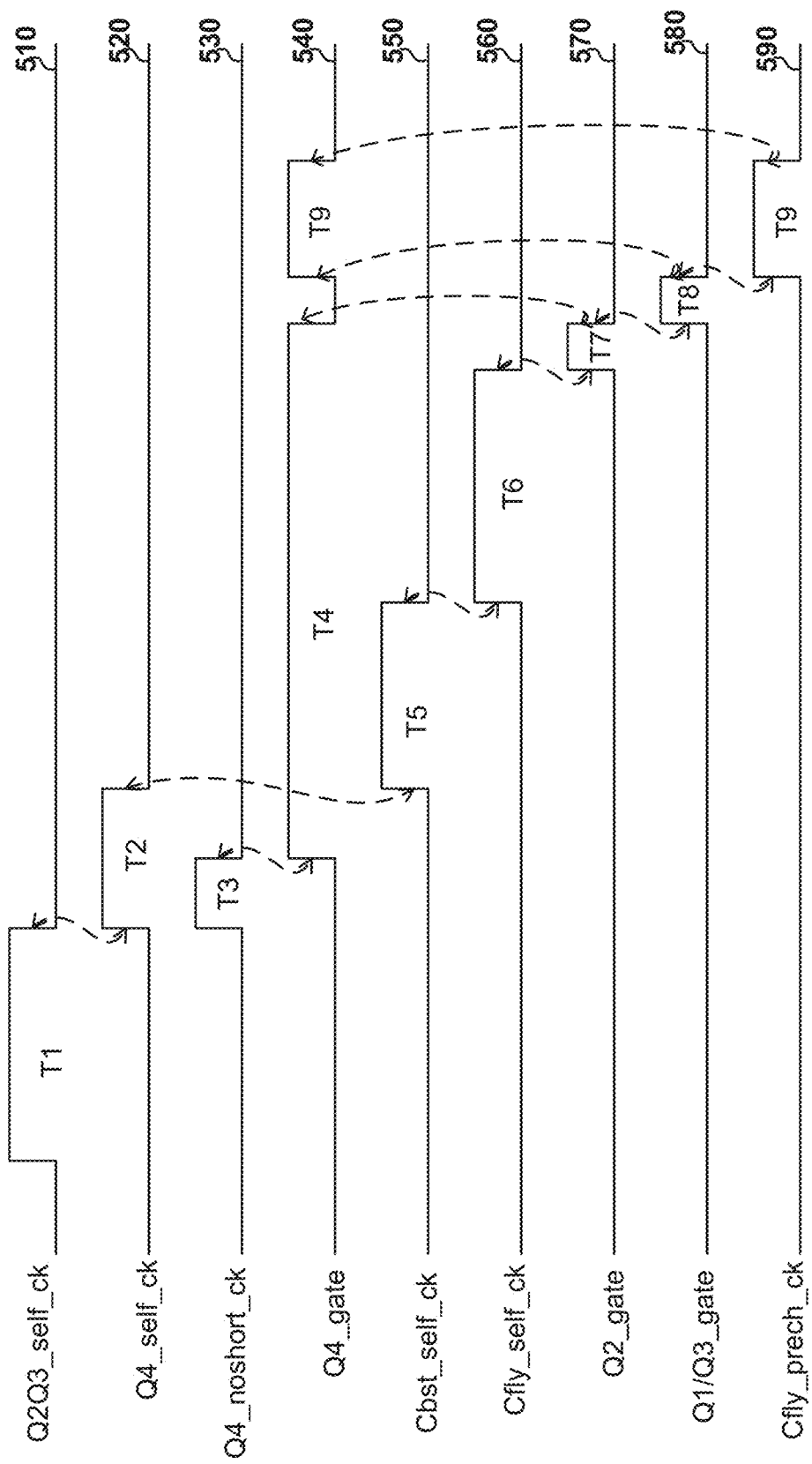
FIG. 5 shows simplified timing diagrams for certain components of the power converter as shown in FIG. 2 and/or FIG. 3 according to some embodiments of the present invention.

FIG. 5 shows simplified timing diagrams for certain components of the power converter 200 as shown in FIG. 2 and/or FIG. 3 according to some embodiments of the present invention. These diagrams are merely examples, which should not unduly limit the scope of the claims. One of ordinary skill in the art would recognize many variations, alternatives, and modifications. The waveform 510 represents the control signal 710 as a function of time, the waveform 520 represents the control signal 720 as a function of time, the waveform 530 represents the control signal 730 as a function of time, the waveform 540 represents the control signal 740 as a function of time, the waveform 550 represents the control signal 750 as a function of time, the waveform 560 represents the control signal 760 as a function of time, the waveform 570 represents the control signal 770 as a function of time, the waveform 580 represents the control signal 780 as a function of time and also represents the control signal 782 as a function of time, and the waveform 590 represents the control signal 790 as a function of time.

As discussed above and further emphasized here, FIG. 5 is merely an example, which should not unduly limit the scope of the claims. One of ordinary skill in the art would recognize many variations, alternatives, and modifications. In certain examples, the waveforms 510, 520, 530, 540, 550, 560, 570, 580 and 590 are used to represent timing diagrams for certain components of the power converter 200 as shown in FIG. 2 and/or FIG. 4. For example, the transistor 312 as shown in FIG. 3 corresponds to the transistor 412 as shown in FIG. 4, the transistor 314 as shown in FIG. 3 corresponds to the transistor 414 as shown in FIG. 4, the transistor 316 as shown in FIG. 3 corresponds to the transistor 416 as shown in FIG. 4, and the transistor 318 as shown in FIG. 3 corresponds to the transistor 418 as shown in FIG. 4. As an example, the capacitor 322 as shown in FIG. 3 corresponds to the capacitor 422 as shown in FIG. 4, and the capacitor 324 as shown in FIG. 3 corresponds to the capacitor 424 as shown in FIG. 4.

Figure 6:
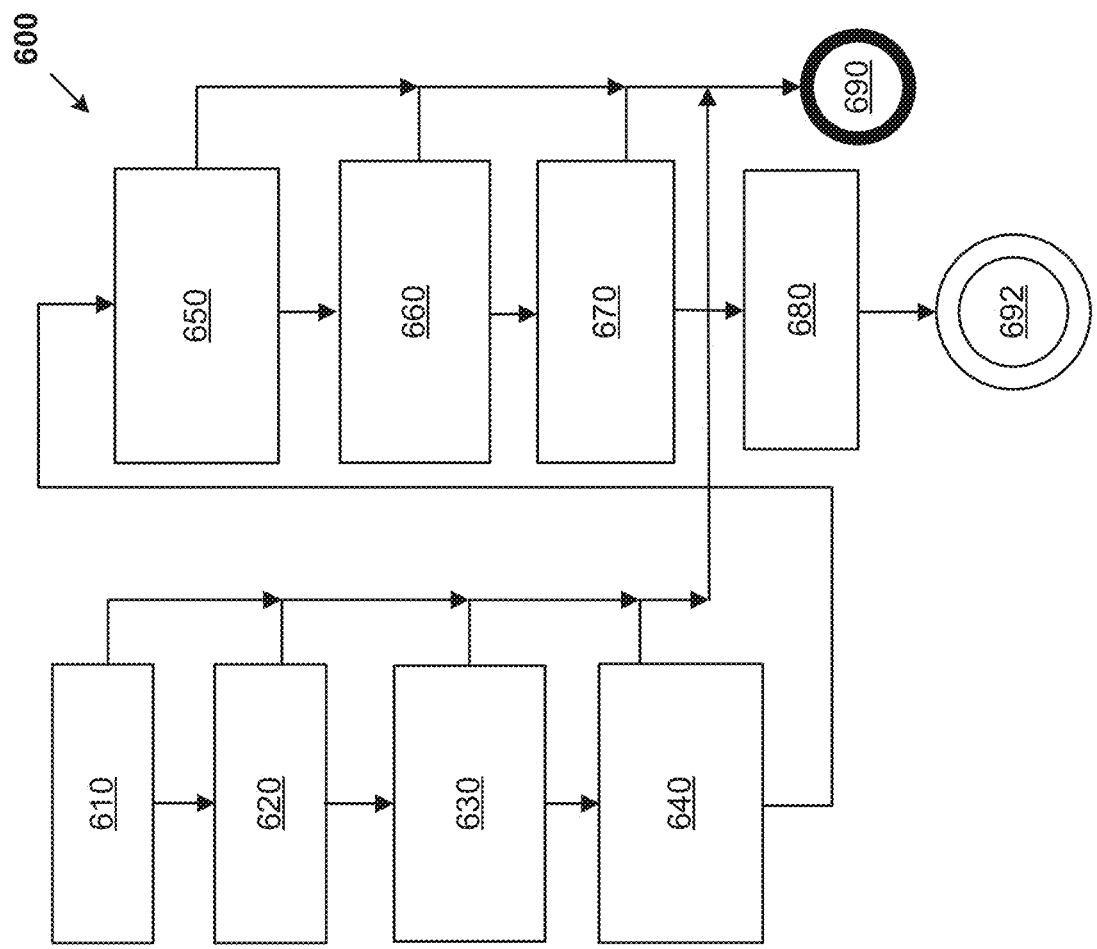
FIG. 6 is a simplified method related to the circuit 202 as part of the charge pump as shown in FIG. 2 and FIG. 3 according to some embodiments of the present invention.

FIG. 6 is a simplified method related to the circuit 202 as part of the charge pump 200 as shown in FIG. 2 and FIG. 3 according to some embodiments of the present invention. This diagram is merely an example, which should not unduly limit the scope of the claims. One of ordinary skill in the art would recognize many variations, alternatives, and modifications. The method 600 includes a process 610 for determining whether it is true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor), a process 620 for determining whether it is true that the transistor 318 is not defectively related to a short circuit (e.g., does not form a short circuit between the drain terminal and the source terminal of the transistor when the transistor is turned off), a process 630 for determining whether it is true that the transistor 318 is not defectively related to an open circuit (e.g., does not form an open circuit between the drain terminal and the source terminal of the transistor when the transistor is turned on), a process 640 for determining whether it is true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires), a process 650 for determining whether it is true that the capacitor 324 is not defectively related to an open circuit (e.g., does not form an open circuit caused by one or more capacitor plates being disconnected from one or more corresponding wires), a process 660 for determining whether it is true that the transistor 314 is not defectively related to an open circuit (e.g., does not form an open circuit between the drain terminal and the source terminal of the transistor when the transistor is turned on), a process 670 for determining whether it is true that each transistor of the transistors 312 and the transistor 316 is not defectively related to an open circuit (e.g., does not form an open circuit between the drain terminal and the source terminal of the transistor when the transistor is turned on), a process 680 for performing the pre-start process, a process 690 for stopping the self-detection process, and a process 692 for starting normal operation related to the charge pump 200. For example, the processes 610, 620, 630, 640, 650, 660 and 670 are parts of the self-detection process. As an example, the process 680 is part of the pre-start process. Although the above has been shown using a selected group of processes for the method 600, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 610, whether it is true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor) is determined according to certain embodiments. For example, if it is true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor), the process 620 is performed. As an example, if it is not true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor), the process 690 is performed.

In some examples, at the beginning of the self-detection process, each transistor of the transistors 312, 314, 316 and 318 is turned off. For example, when the control signal 710 (e.g., Q2Q3_self_ck) is at a logic high level (e.g., during the time duration T1 as shown by the waveform 510), the current generated by the current source 340 (e.g., the current Idis_cfh1) is used to discharge the terminal 392 (e.g., CFH1), and the current generated by the current source 342 (e.g., Idis_cfl1) is used to discharge the terminal 394 (e.g., CFL1) in order to perform short-circuit detection for the transistor 312 (e.g., Q1), the transistor 314 (e.g., Q2), the transistor 316 (e.g., Q3), and the capacitor 324 (e.g., CFLY1).

For example, when the control signal 710 (e.g., Q2Q3_self_ck) changes from the logic high level to a logic low level (e.g., at the end of the time duration T1 as shown by the waveform 510), if the output of the comparator 352 (e.g., COMP1) and the output of the comparator 354 (e.g., COMP2) indicate that the voltage at the terminal 392 (e.g., CFH1) is smaller than VOUT-VR2 and the voltage at the terminal 394 (e.g., CFL1) is smaller than VR1, it is true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor), and the process 620 is then performed.

As an example, when the control signal 710 (e.g., Q2Q3_self_ck) changes from the logic high level to the logic low level (e.g., at the end of the time duration T1 as shown by the waveform 510), if the output of the comparator 352 (e.g., COMP1) and the output of the comparator 354 (e.g., COMP2) indicate that the voltage at the terminal 392 (e.g., CFH1) is not smaller than VOUT-VR2 and/or the voltage at the terminal 394 (e.g., CFL1) is not smaller than VR1, it is not true that each transistor of the transistors 312, 314 and 316 is not defectively related to a short circuit (e.g., does not form a short circuit between the drain terminal and the source terminal of the transistor when the transistor is turned off) and the capacitor 324 is not defectively related to a short circuit (e.g., does not form a short circuit between two terminals of the capacitor), and the process 690 is performed.

At the process 620, whether it is true that the transistor 318 is not defectively related to a short circuit (e.g., does not form a short circuit between the drain terminal and the source terminal of the transistor when the transistor is turned off) is determined according to certain embodiments. For example, if it is true that the transistor 318 is not defectively related to a short circuit (e.g., does not form a short circuit between the drain terminal and the source terminal of the transistor when the transistor is turned off), the process 630 is performed. As an example, if it is not true that the transistor 318 is not defectively related to a short circuit (e.g., does not form a short circuit between the drain terminal and the source terminal of the transistor when the transistor is turned off), the process 690 is performed.

In some examples, each transistor of the transistors 312, 314, 316 and 318 is turned off. For example, when the control signal 720 (e.g., Q4_self_ck) is at a logic high level and the control signal 730 (e.g., Q4_noshort_ck) is also at a logic high level (e.g., during the overlapping duration of the time duration T2 and the time duration T3 as shown by the waveforms 520 and 530), the current generated by the current source 344 (e.g., the current Ich_cfl1) is used to charge the terminal 394 (e.g., CFL1) in order to perform short-circuit detection for the transistor 318 (e.g., Q4).

For example, when the control signal 730 (e.g., Q4_noshort_ck) changes from the logic high level to the logic low level (e.g., at the end of the time duration T3 as shown by the waveform 530), if the output of the comparator 356 (e.g., COMP3) indicate that the voltage at the terminal 394 (e.g., CFL1) is larger than VR1, it is true that the transistor 318 is not defectively related to a short circuit (e.g., does not form a short circuit between the drain terminal and the source terminal of the transistor when the transistor is turned off), and the process 630 is then performed.

As an example, when the control signal 730 (e.g., Q4_noshort_ck) changes from the logic high level to the logic low level (e.g., at the end of the time duration T3 as shown by the waveform 530), if the output of the comparator 356 (e.g., COMP3) indicate that the voltage at the terminal 394 (e.g., CFL1) is not larger than VR1, it is not true that the transistor 318 is not defectively related to a short circuit (e.g., does not form a short circuit between the drain terminal and the source terminal of the transistor when the transistor is turned off), and the process 690 is then performed.

At the process 630, whether it is true that the transistor 318 is not defectively related to an open circuit (e.g., does not form an open circuit between the drain terminal and the source terminal of the transistor when the transistor is turned on) is determined according to certain embodiments. For example, if it is true that the transistor 318 is not defectively related to an open circuit (e.g., does not form an open circuit between the drain terminal and the source terminal of the transistor when the transistor is turned on), the process 640 is performed. As an example, if it is not true that the transistor 318 is not defectively related to an open circuit (e.g., does not form an open circuit between the drain terminal and the source terminal of the transistor when the transistor is turned on), the process 690 is performed.

In some examples, each transistor of the transistors 312, 314 and 316 is turned off and the transistor 318 is turned on. For example, when the control signal 720 (e.g., Q4_self_ck) is at a logic high level and the control signal 740 (e.g., Q4_gate) is also at a logic high level (e.g., during the overlapping duration of the time duration T2 and the time duration T4 as shown by the waveforms 520 and 540), the current generated by the current source 344 (e.g., the current Ich_cfl1) is used to charge the terminal 394 (e.g., CFL1) in order to perform open-circuit detection for the transistor 318 (e.g., Q4).

For example, when the control signal 720 (e.g., Q4_self_ck) changes from the logic high level to the logic low level (e.g., at the end of the time duration T2 as shown by the waveform 520), if the output of the comparator 358 (e.g., COMP4) indicate that the voltage at the terminal 394 (e.g., CFL1) is smaller than VRT, it is true that the transistor 318 is not defectively related to an open circuit (e.g., does not form an open circuit between the drain terminal and the source terminal of the transistor when the transistor is turned on), and the process 640 is then performed.

As an example, when the control signal 720 (e.g., Q4_self_ck) changes from the logic high level to the logic low level (e.g., at the end of the time duration T2 as shown by the waveform 520), if the output of the comparator 358 (e.g., COMP4) indicate that the voltage at the terminal 394 (e.g., CFL1) is not smaller than VR1, it is not true that the transistor 318 is not defectively related to an open circuit (e.g., does not form an open circuit between the drain terminal and the source terminal of the transistor when the transistor is turned on), and the process 690 is then performed.

At the process 640, whether it is true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires) is determined according to certain embodiments. For example, if it is true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires), the process 650 is performed. As an example, if it is not true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires), the process 690 is performed.

In some examples, each transistor of the transistors 312, 314 and 316 is turned off and the transistor 318 is turned on.

For example, when the control signal 740 (e.g., Q4_gate) is at the logic high level and the control signal 750 (e.g., Cbst_self_ck) is also at a logic high level (e.g., during the overlapping duration of the time duration T4 and the time duration T5 as shown by the waveforms 540 and 550), the current generated by the current source 346 (e.g., the current Ich_bst1) is used to charge the terminal 390 (e.g., BST1) in order to perform short-circuit detection and open-circuit detection for the capacitor 322 (e.g., CBST1).

For example, when the control signal 750 (e.g., Cbst_self_ck) changes from the logic high level to the logic low level (e.g., at the end of the time duration T5 as shown by the waveform 550), if the output of the comparator 372 (e.g., COMP5) indicates that the voltage at the terminal 392 (e.g., CFH1) is smaller than the voltage at the terminal 390 (e.g., BST1) minus VR1 and the output of the comparator 374 (e.g., COMP6) indicates that the voltage at the terminal 390 (e.g., BST1) is smaller than PMID-VR2, it is true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires), and the process 650 is then performed.

As an example, when the control signal 750 (e.g., Cbst_self_ck) changes from the logic high level to the logic low level (e.g., at the end of the time duration T5 as shown by the waveform 550), if the output of the comparator 372 (e.g., COMP5) indicates that the voltage at the terminal 392 (e.g., CFH1) is not smaller than the voltage at the terminal 390 (e.g., BST1) minus VR1 and/or the output of the comparator 374 (e.g., COMP6) indicates that the voltage at the terminal 390 (e.g., BST1) is not smaller than PMID-VR2, it is not true that the capacitor 322 is not defectively related to a short circuit (e.g., does not form a short circuit between two terminals of the capacitor) and also is not defectively related to an open circuit (e.g., does not form an open circuit caused by one or more capacitor plates being disconnected from one or more corresponding wires), and the process 690 is then performed. In some examples, if the capacitor 322 is defectively related to a short circuit (e.g., if the capacitor 322 forms a short circuit between two terminals of the capacitor), the process 690 is then performed. In certain examples, if the capacitor 322 is defectively related to an open circuit (e.g., if the capacitor 322 forms an open circuit caused by one or more capacitor plates being disconnected from one or more corresponding wires), the process 690 is then performed.

At the process 650, whether it is true that the capacitor 324 is not defectively related to an open circuit (e.g., does not form an open circuit caused by one or more capacitor plates being disconnected from one or more corresponding wires) is determined according to certain embodiments. For example, if it is true that the capacitor 324 is not defectively related to an open circuit (e.g., does not form an open circuit caused by one or more capacitor plates being disconnected from one or more corresponding wires), the process 660 is performed. As an example, if it is not true that the capacitor 324 is not defectively related to an open circuit (e.g., does not form an open circuit caused by one or more capacitor plates being disconnected from one or more corresponding wires), the process 690 is performed.

In some examples, each transistor of the transistors 312, 314 and 316 is turned off and the transistor 318 is turned on. For example, when the control signal 740 (e.g., Q4_gate) is at the logic high level and the control signal 760 (e.g., Cfly_self_ck) is also at a logic high level (e.g., during the overlapping duration of the time duration T4 and the time duration T6 as shown by the waveforms 540 and 560), the current generated by the current source 348 (e.g., the current Ich_cfh1) is used to charge the terminal 392 (e.g., CFH1) in order to perform open-circuit detection for the capacitor 324 (e.g., CFLY1).

For example, when the control signal 760 (e.g., Cfly_self_ck) changes from the logic high level to the logic low level (e.g., at the end of the time duration T6 as shown by the waveform 560), if the output of the comparator 376 (e.g., COMP7) indicates that VOUT is larger than the voltage at the terminal 392 (e.g., CFH1) minus VR3, it is true that the capacitor 324 is not defectively related to an open circuit (e.g., does not form an open circuit caused by one or more capacitor plates being disconnected from one or more corresponding wires), and the process 660 is then performed.

As an example, when the control signal 760 (e.g., Cfly_self_ck) changes from the logic high level to the logic low level (e.g., at the end of the time duration T6 as shown by the waveform 560), if the output of the comparator 376 (e.g., COMP7) indicates that VOUT is not larger than the voltage at the terminal 392 (e.g., CFH1) minus VR3, it is not true that the capacitor 324 is not defectively related to an open circuit (e.g., does not form an open circuit caused by one or more capacitor plates being disconnected from one or more corresponding wires), and the process 690 is then performed.

At the process 660, whether it is true that the transistor 314 is not defectively related to an open circuit (e.g., does not form an open circuit between the drain terminal and the source terminal of the transistor when the transistor is turned on) is determined according to certain embodiments. For example, if it is true that the transistor 314 is not defectively related to an open circuit (e.g., does not form an open circuit between the drain terminal and the source terminal of the transistor when the transistor is turned on), the process 670 is performed. As an example, if it is not true that the transistor 314 is not defectively related to an open circuit (e.g., does not form an open circuit between the drain terminal and the source terminal of the transistor when the transistor is turned on), the process 690 is performed.

In some examples, each transistor of the transistors 312 and 316 is turned off and each transistor of the transistor 314 and the transistor 318 is turned on. For example, the control signal 740 (e.g., Q4_gate) is at the logic high level and the control signal 770 (e.g., Q2_gate) is also at a logic high level (e.g., during the overlapping duration of the time duration T4 and the time duration T7 as shown by the waveforms 540 and 570).

For example, when the control signal 770 (e.g., Q2_gate) changes from the logic high level to the logic low level (e.g., at the end of both the time duration T4 and the time duration T7 as shown by the waveforms 540 and 570), if the output of the comparator 378 (e.g., COMP8) indicates that the voltage at the terminal 392 (e.g., CFH1) is larger than VOUT-VR1, it is true that the transistor 314 is not defectively related to an open circuit (e.g., does not form an open circuit between the drain terminal and the source terminal of the transistor when the transistor is turned on), and the process 670 is then performed.

As an example, when the control signal 770 (e.g., Q2_gate) changes from the logic high level to the logic low level (e.g., at the end of both the time duration T4 and the time duration T7 as shown by the waveforms 540 and 570), if the output of the comparator 378 (e.g., COMP8) indicates that the voltage at the terminal 392 (e.g., CFH1) is not larger than VOUT-VR1, it is not true that the transistor 314 is not defectively related to an open circuit (e.g., does not form an open circuit between the drain terminal and the source terminal of the transistor when the transistor is turned on), and the process 690 is then performed.

At the process 670, whether it is true that each transistor of the transistors 312 and the transistor 316 is not defectively related to an open circuit (e.g., does not form an open circuit between the drain terminal and the source terminal of the transistor when the transistor is turned on) is determined according to certain embodiments. For example, if it is true that each transistor of the transistors 312 and the transistor 316 is not defectively related to an open circuit (e.g., does not form an open circuit between the drain terminal and the source terminal of the transistor when the transistor is turned on), the process 680 is performed. As an example, if it is not true that each transistor of the transistors 312 and the transistor 316 is not defectively related to an open circuit (e.g., does not form an open circuit between the drain terminal and the source terminal of the transistor when the transistor is turned on), the process 690 is performed.

In some examples, each transistor of the transistors 314 and 318 is turned off and each transistor of the transistor 312 and the transistor 316 is turned on. For example, the control signal 780 (e.g., Q1_gate) and the control signal 782 (e.g., Q3_gate) both are at a logic high level (e.g., during the time duration T8 as shown by the waveform 580).

For example, when the control signal 780 (e.g., Q1_gate) and the control signal 782 (e.g., Q3_gate) change from the logic high level to the logic low level (e.g., at the end of the time duration T8 as shown by the waveform 580), if the output of the comparator 380 (e.g., COMP9) indicates that the voltage at the terminal 392 (e.g., CFH1) is larger than PMID-VR1 and the output of the comparator 382 (e.g., COMP10) indicates that VOUT is larger than the voltage at the terminal 394 (e.g., CFL1) minus VR1, it is true that each transistor of the transistors 312 and the transistor 316 is not defectively related to an open circuit (e.g., does not form an open circuit between the drain and the source terminal of the transistor when the transistor is turned on), and the process 680 is then performed.

As an example, when the control signal 780 (e.g., Q1_gate) and the control signal 782 (e.g., Q3_gate) change from the logic high level to the logic low level (e.g., at the end of the time duration T8 as shown by the waveform 580), if the output of the comparator 380 (e.g., COMP9) indicates that the voltage at the terminal 392 (e.g., CFH1) is not larger than PMID-VR1 and/or the output of the comparator 382 (e.g., COMP10) indicates that VOUT is not larger than the voltage at the terminal 394 (e.g., CFL1) minus VR1, it is not true that each transistor of the transistors 312 and the transistor 316 is not defectively related to an open circuit (e.g., does not form an open circuit between the drain terminal and the source terminal of the transistor when the transistor is turned on), and the process 690 is then performed. In some examples, if the transistor 312 is defectively related to an open circuit (e.g., if the transistor 312 forms an open circuit between the drain terminal and the source terminal of the transistor when the transistor is turned on), the process 690 is then performed. In certain examples, if the transistor 316 is defectively related to an open circuit (e.g., if the transistor 316 forms an open circuit between the drain terminal and the source terminal of the transistor when the transistor is turned on), the process 690 is then performed.

At the process 680, the pre-start process is performed according to some embodiments. In certain examples, each transistor of the transistors 312, 314 and 316 is turned off and the transistor 318 is turned on. For example, when the control signal 790 (e.g., Cfly_prech_ck) is at a logic high level (e.g., during the time duration T9 as shown by the waveform 590), the current generated by the current source 350 (e.g., the current Idis_cfh2) is used to discharge the terminal 392 (e.g., CFH1) until the voltage at the terminal 392 (e.g., CFH1) becomes smaller than half of PMID. As an example, the voltage at the terminal 392 (e.g., CFH1) becomes smaller than half of PMID, the control signal 790 (e.g., Cfly_prech_ck) changes from the logic high level to the logic low level (e.g., at the end of the time duration T9 as shown by the waveform 590), indicating the completion of the pre-start process. In some examples, at the process 680, the pre-start process is performed in order to reduce the voltage at the terminal 392 (e.g., CFH1). For example, if the voltage at the terminal 392 (e.g., CFH1) is too high after the transistors 312, 314, 316 and 318 enter normal operation, when one or more transistors of the transistors 312, 314, 316 and 318 become turned on, one or more excess currents may be generated. As an example, the one or more excess currents can damage one or more electric components of the charge pump 200, so at the process 680, the pre-start process is performed to protect the charge pump 200. In some examples, after the process 680, the process 692 is performed.

At the process 690, the self-detection process is stopped according to some embodiments. For example, one or more abnormalities are detected, so the self-detection process is stopped. At the process 692, normal operation related to the charge pump 200 is started according to certain embodiments. For example, the self-detection process and the pre-start process both are completed, and the transistors 312, 314, 316 and 318 enters normal operation.

As discussed above and further emphasized here, FIG. 6 is merely an example, which should not unduly limit the scope of the claims. One of ordinary skill in the art would recognize many variations, alternatives, and modifications. In certain examples, the processes 610, 620, 630, 640, 650, 660, 670, 680, 690 and 692 are used for certain components of the power converter 200 as shown in FIG. 2 and/or FIG. 4. For example, the transistor 312 as shown in FIG. 3 corresponds to the transistor 412 as shown in FIG. 4, the transistor 314 as shown in FIG. 3 corresponds to the transistor 414 as shown in FIG. 4, the transistor 316 as shown in FIG. 3 corresponds to the transistor 416 as shown in FIG. 4, and the transistor 318 as shown in FIG. 3 corresponds to the transistor 418 as shown in FIG. 4. As an example, the capacitor 322 as shown in FIG. 3 corresponds to the capacitor 422 as shown in FIG. 4, and the capacitor 324 as shown in FIG. 3 corresponds to the capacitor 424 as shown in FIG. 4.

As shown in FIG. 2, FIG. 3, and FIG. 4, the charge pump 200 performs the self-detection process and the pre-start process according to some embodiments. For example, the self-detection process and the pre-start process are performed to ensures safe and reliable operation of the charge pump 200. In certain examples, as shown in FIG. 5 and FIG. 6, the processes 610, 620, 630, 640, 650, 660 and 670 are parts of the self-detection process. In some examples, as shown in FIG. 5 and FIG. 6, the process 680 is part of the pre-start process.

According to certain embodiments, a charge pump for converting an input voltage to an output voltage includes: a first capacitor connected between a first terminal and a second terminal; a second capacitor connected between the second terminal and a third terminal; a first transistor including a first drain, a first source, and a first gate, the first drain being connected to an input terminal configured to receive the input voltage; a second transistor including a second drain, a second source, and a second gate, the second drain being connected to the first source and the second terminal; a third transistor including a third drain, a third source, and a third gate, the third drain being connected to the second source and an output terminal configured to output the output voltage; a fourth transistor including a fourth drain, a fourth source, and a fourth gate, the fourth drain being connected to the third source and the third terminal, the fourth source being connected to a ground terminal; and an internal circuit configured to perform a self-detection process by determining whether or not at least one defect has been detected for at least one component selected from a group consisting of the first capacitor, the second capacitor, the first transistor, the second transistor, the third transistor, and the fourth transistor; wherein the at least one defect includes an open circuit related to the component or a short circuit related to the component. For example, the charge pump is implemented according to at least FIG. 2, FIG. 3, FIG. 5, and/or FIG. 6.

As an example, the at least one defect includes the open circuit related to the component and the short circuit related to the component. For example, the internal circuit is further configured to, if the defect has been detected for any component of the first capacitor, the second capacitor, the first transistor, the second transistor, the third transistor, or the fourth transistor, stop the self-detection process. As an example, the internal circuit is further configured to, if no defect is detected for all components of the first capacitor, the second capacitor, the first transistor, the second transistor, the third transistor, and the fourth transistor, perform a pre-start process by at least adjusting a terminal voltage at the second terminal. For example, the internal circuit is further configured to, if no defect is detected for all components of the first capacitor, the second capacitor, the first transistor, the second transistor, the third transistor, and the fourth transistor, change the terminal voltage at the second terminal so that the terminal voltage becomes smaller than half of the input voltage. As an example, the internal circuit is further configured to determine whether or not a short circuit has been detected for any component of the second capacitor, the first transistor, the second transistor, or the third transistor. For example, the internal circuit is further configured to determine whether or not a short circuit has been detected for the fourth transistor. As an example, the internal circuit is further configured to determine whether or not an open circuit has been detected for the fourth transistor.

For example, the internal circuit is further configured to determine whether or not one or more defects have been detected for the first capacitor. As an example, the one or more defects for the first capacitor include a short circuit for the first capacitor. For example, the one or more defects for the first capacitor include an open circuit for the first capacitor. As an example, the internal circuit is further configured to determine whether or not an open circuit has been detected for the second capacitor. For example, the internal circuit is further configured to determine whether or not an open circuit has been detected for the second transistor.

As an example, the internal circuit is further configured to determine whether or not one or more open circuits have been detected for the first transistor or the third transistor. For example, the one or more open circuits for the first transistor or the third transistor includes an open circuit for the first transistor. As an example, the one or more open circuits for the first transistor or the third transistor includes an open circuit for the third transistor.

According to certain embodiments, a method for a charge pump configured to convert an input voltage to an output voltage includes: performing a self-detection process including determining whether or not at least one defect has been detected for at least one component selected from a group consisting of a first capacitor, a second capacitor, a first transistor, a second transistor, a third transistor, and a fourth transistor; wherein: the first capacitor is connected between a first terminal and a second terminal; the second capacitor is connected between the second terminal and a third terminal; the first transistor including a first drain, a first source, and a first gate, the first drain being connected to an input terminal configured to receive the input voltage; the second transistor including a second drain, a second source, and a second gate, the second drain being connected to the first source and the second terminal; the third transistor including a third drain, a third source, and a third gate, the third drain being connected to the second source and an output terminal configured to output the output voltage; and the fourth transistor including a fourth drain, a fourth source, and a fourth gate, the fourth drain being connected to the third source and the third terminal, the fourth source being connected to a ground terminal; wherein the at least one defect includes an open circuit related to the component or a short circuit related to the component. For example, the method is implemented according to at least FIG. 2, FIG. 3, FIG. 5, and/or FIG. 6.

As an example, the at least one defect includes the open circuit related to the component and the short circuit related to the component. For example, the method further includes: if the defect has been detected for any component of the first capacitor, the second capacitor, the first transistor, the second transistor, the third transistor, or the fourth transistor, stopping the self-detection process. As an example, the method further includes: if no defect is detected for all components of the first capacitor, the second capacitor, the first transistor, the second transistor, the third transistor, and the fourth transistor, performing a pre-start process including adjusting a terminal voltage at the second terminal. For example, the method further includes: if no defect is detected for all components of the first capacitor, the second capacitor, the first transistor, the second transistor, the third transistor, and the fourth transistor, changing the terminal voltage at the second terminal so that the terminal voltage becomes smaller than half of the input voltage.

As an example, the method further includes: determining whether or not a short circuit has been detected for any component of the second capacitor, the first transistor, the second transistor, or the third transistor. For example, the method further includes: determining whether or not a short circuit has been detected for the fourth transistor. As an example, the method further includes: determining whether or not an open circuit has been detected for the fourth transistor.

For example, the method further includes: determining whether or not one or more defects have been detected for the first capacitor. As an example, the determining whether or not one or more defects have been detected for the first capacitor includes determining whether or not a short circuit has been detected for the first capacitor. For example, the determining whether or not one or more defects have been detected for the first capacitor includes determining whether or not an open circuit has been detected for the first capacitor.

As an example, the method further includes: determining whether or not an open circuit has been detected for the second capacitor. For example, the method further includes: determining whether or not an open circuit has been detected for the second transistor. As an example, the method further includes: determining whether or not one or more open circuits have been detected for the first transistor or the third transistor. For example, the determining whether or not one or more open circuits have been detected for the first transistor or the third transistor includes determining whether or not an open circuit has been detected for the first transistor. As an example, the determining whether or not one or more open circuits have been detected for the first transistor or the third transistor includes determining whether or not an open circuit has been detected for the third transistor. For example, the determining whether or not one or more open circuits have been detected for the first transistor or the third transistor includes determining whether or not one or more open circuits have been detected for the first transistor and the third transistor.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A charge pump for converting an input voltage to an output voltage, the charge pump comprising:
   a first capacitor connected between a first terminal and a second terminal;
   a second capacitor connected between the second terminal and a third terminal;
   a first transistor including a first drain, a first source, and a first gate, the first drain being connected to an input terminal configured to receive the input voltage;
   a second transistor including a second drain, a second source, and a second gate, the second drain being connected to the first source and the second terminal;
   a third transistor including a third drain, a third source, and a third gate, the third drain being connected to the second source and an output terminal configured to output the output voltage;
   a fourth transistor including a fourth drain, a fourth source, and a fourth gate, the fourth drain being connected to the third source and the third terminal, the fourth source being connected to a ground terminal; and
   an internal circuit configured to perform a self-detection process by determining whether or not at least one defect has been detected for at least one component selected from a group consisting of the first capacitor, the second capacitor, the first transistor, the second transistor, the third transistor, and the fourth transistor;
   wherein the at least one defect includes an open circuit related to the component or a short circuit related to the component;
   wherein the internal circuit is further configured to, if no defect is detected for all components of the first capacitor, the second capacitor, the first transistor, the second transistor, the third transistor, and the fourth transistor, perform a pre-start process by at least adjusting a terminal voltage at the second terminal.

2. The charge pump of claim 1 wherein the at least one defect includes the open circuit related to the component and the short circuit related to the component.

3. The charge pump of claim 1 wherein the internal circuit is further configured to, if the defect has been detected for any component of the first capacitor, the second capacitor, the first transistor, the second transistor, the third transistor, or the fourth transistor, stop the self-detection process.

4. The charge pump of claim 1 wherein the internal circuit is further configured to, if no defect is detected for all components of the first capacitor, the second capacitor, the first transistor, the second transistor, the third transistor, and the fourth transistor, change the terminal voltage at the second terminal so that the terminal voltage becomes smaller than half of the input voltage.

5. A charge pump for converting an input voltage to an output voltage, the charge pump comprising:
   a first capacitor connected between a first terminal and a second terminal;
   a second capacitor connected between the second terminal and a third terminal;
   a first transistor including a first drain, a first source, and a first gate, the first drain being connected to an input terminal configured to receive the input voltage;
   a second transistor including a second drain, a second source, and a second gate, the second drain being connected to the first source and the second terminal;
   a third transistor including a third drain, a third source, and a third gate, the third drain being connected to the second source and an output terminal configured to output the output voltage;
   a fourth transistor including a fourth drain, a fourth source, and a fourth gate, the fourth drain being connected to the third source and the third terminal, the fourth source being connected to a ground terminal; and
   an internal circuit configured to perform a self-detection process by determining whether or not at least one defect has been detected for at least one component selected from a group consisting of the first capacitor, the second capacitor, the first transistor, the second transistor, the third transistor, and the fourth transistor;
   wherein the at least one defect includes an open circuit related to the component or a short circuit related to the component;
   wherein the internal circuit is further configured to determine whether or not a short circuit has been detected for any component of the second capacitor, the first transistor, the second transistor, or the third transistor;
   wherein the internal circuit is further configured to determine whether or not a short circuit has been detected for the fourth transistor.

6. The charge pump of claim 5 wherein the internal circuit is further configured to determine whether or not an open circuit has been detected for the fourth transistor.

7. The charge pump of claim 6 wherein the internal circuit is further configured to determine whether or not one or more defects have been detected for the first capacitor.

8. The charge pump of claim 7 wherein the one or more defects for the first capacitor include a short circuit for the first capacitor.

9. The charge pump of claim 7 wherein the one or more defects for the first capacitor include an open circuit for the first capacitor.

10. The charge pump of claim 7 wherein the internal circuit is further configured to determine whether or not an open circuit has been detected for the second capacitor.

11. The charge pump of claim 10 wherein the internal circuit is further configured to determine whether or not an open circuit has been detected for the second transistor.

12. The charge pump of claim 11 wherein the internal circuit is further configured to determine whether or not one or more open circuits have been detected for the first transistor or the third transistor.

13. The charge pump of claim 12 wherein the one or more open circuits for the first transistor or the third transistor includes an open circuit for the first transistor.

14. The charge pump of claim 12 wherein the one or more open circuits for the first transistor or the third transistor includes an open circuit for the third transistor.

15. A method for a charge pump configured to convert an input voltage to an output voltage, the method comprising:
performing a self-detection process including determining whether or not at least one defect has been detected for at least one component selected from a group consisting of a first capacitor, a second capacitor, a first transistor, a second transistor, a third transistor, and a fourth transistor, the first capacitor being connected between a first terminal and a second terminal; and
if no defect is detected for all components of the first capacitor, the second capacitor, the first transistor, the second transistor, the third transistor, and the fourth transistor, performing a pre-start process including adjusting a terminal voltage at the second terminal;
wherein:
the second capacitor is connected between the second terminal and a third terminal;
the first transistor includes a first drain, a first source, and a first gate, the first drain being connected to an input terminal configured to receive the input voltage;
the second transistor includes a second drain, a second source, and a second gate, the second drain being connected to the first source and the second terminal;
the third transistor includes a third drain, a third source, and a third gate, the third drain being connected to the second source and an output terminal configured to output the output voltage; and
the fourth transistor includes a fourth drain, a fourth source, and a fourth gate, the fourth drain being connected to the third source and the third terminal, the fourth source being connected to a ground terminal;
wherein the at least one defect includes an open circuit related to the component or a short circuit related to the component.

16. The method of claim 15 wherein the at least one defect includes the open circuit related to the component and the short circuit related to the component.

17. The method of claim 15, and further comprising:
if the defect has been detected for any component of the first capacitor, the second capacitor, the first transistor, the second transistor, the third transistor, or the fourth transistor, stopping the self-detection process.

18. The method of claim 15, and further comprising:
if no defect is detected for all components of the first capacitor, the second capacitor, the first transistor, the second transistor, the third transistor, and the fourth transistor, changing the terminal voltage at the second terminal so that the terminal voltage becomes smaller than half of the input voltage.

19. A method for a charge pump configured to convert an input voltage to an output voltage, the method comprising:
performing a self-detection process including determining whether or not at least one defect has been detected for at least one component selected from a group consisting of a first capacitor, a second capacitor, a first transistor, a second transistor, a third transistor, and a fourth transistor;
determining whether or not a short circuit has been detected for any component of the second capacitor, the first transistor, the second transistor, or the third transistor; and
determining whether or not a short circuit has been detected for the fourth transistor;
wherein:
the first capacitor is connected between a first terminal and a second terminal;
the second capacitor is connected between the second terminal and a third terminal;
the first transistor includes a first drain, a first source, and a first gate, the first drain being connected to an input terminal configured to receive the input voltage;
the second transistor includes a second drain, a second source, and a second gate, the second drain being connected to the first source and the second terminal;
the third transistor includes a third drain, a third source, and a third gate, the third drain being connected to the second source and an output terminal configured to output the output voltage; and
the fourth transistor includes a fourth drain, a fourth source, and a fourth gate, the fourth drain being connected to the third source and the third terminal, the fourth source being connected to a ground terminal;
wherein the at least one defect includes an open circuit related to the component or a short circuit related to the component.

20. The method of claim 19, and further comprising:
determining whether or not an open circuit has been detected for the fourth transistor.

21. The method of claim 20, and further comprising:
determining whether or not one or more defects have been detected for the first capacitor.

22. The method of claim 21 wherein the determining whether or not one or more defects have been detected for the first capacitor includes determining whether or not a short circuit has been detected for the first capacitor.

23. The method of claim 21 wherein the determining whether or not one or more defects have been detected for the first capacitor includes determining whether or not an open circuit has been detected for the first capacitor.

24. The method of claim 21, and further comprising:
determining whether or not an open circuit has been detected for the second capacitor.

25. The method of claim 24, and further comprising:
determining whether or not an open circuit has been detected for the second transistor.

26. The method of claim 25, and further comprising:
determining whether or not one or more open circuits have been detected for the first transistor or the third transistor.

27. The method of claim 26 wherein:
the determining whether or not one or more open circuits have been detected for the first transistor or the third transistor includes determining whether or not an open circuit has been detected for the first transistor.

28. The method of claim 26 wherein:

the determining whether or not one or more open circuits have been detected for the first transistor or the third transistor includes determining whether or not an open circuit has been detected for the third transistor.

29. The method of claim 26 wherein:

the determining whether or not one or more open circuits have been detected for the first transistor or the third transistor includes determining whether or not one or more open circuits have been detected for the first transistor and the third transistor.

* * * * *